United States Patent
Dutton et al.

(10) Patent No.: US 7,222,252 B2
(45) Date of Patent: May 22, 2007

(54) POWER MANAGEMENT OF COMPUTER PERIPHERAL DEVICES WHICH DETERMINES NON-USAGE OF A DEVICE THROUGH USAGE DETECTION OF OTHER DEVICES

(75) Inventors: Drew J. Dutton, Austin, TX (US); James R. MacDonald, Buda, TX (US); Stephen Cox, Lakeway, TX (US)

(73) Assignee: Standard Microsystems Corporation, Hauppauge, NY (US)

( * ) Notice: Subject to any disclaimer, the term of this patent is extended or adjusted under 35 U.S.C. 154(b) by 324 days.

(21) Appl. No.: 10/366,189

(22) Filed: Feb. 13, 2003

(65) Prior Publication Data

US 2004/0163003 A1    Aug. 19, 2004

(51) Int. Cl.
*G06F 1/00*    (2006.01)
*G06F 1/32*    (2006.01)

(52) U.S. Cl. ............. 713/323; 713/300; 713/320; 713/324

(58) Field of Classification Search ........... 713/300, 713/310, 320, 323
See application file for complete search history.

(56) References Cited

U.S. PATENT DOCUMENTS

| | | | | |
|---|---|---|---|---|
| 5,630,144 A | * | 5/1997 | Woog et al. | ........ 713/310 |
| 5,758,173 A | * | 5/1998 | Evoy | ........ 713/320 |
| 5,793,359 A | | 8/1998 | Ushikubo | |
| 5,919,263 A | * | 7/1999 | Kikinis et al. | ........ 713/320 |
| 5,953,511 A | | 9/1999 | Sescila, III et al. | |
| 5,983,357 A | * | 11/1999 | Sun | ........ 713/324 |
| 6,279,060 B1 | | 8/2001 | Luke et al. | |
| 6,317,839 B1 | | 11/2001 | Wells | |
| 6,389,544 B1 | | 5/2002 | Katagiri | |
| 6,435,904 B1 | | 8/2002 | Herbst et al. | |
| 6,467,042 B1 | | 10/2002 | Wright et al. | |
| 6,505,267 B2 | | 1/2003 | Luke et al. | |
| 6,510,524 B1 | | 1/2003 | Osborn et al. | |
| 6,519,669 B1 | | 2/2003 | Yanagisawa | |
| 6,601,180 B1 | | 7/2003 | Paredes et al. | |
| 6,915,143 B2 | * | 7/2005 | Kashu et al. | ........ 455/560 |
| 7,076,675 B2 | * | 7/2006 | Martinez Perez et al. | .. 713/324 |
| 2004/0003299 A1 | * | 1/2004 | Malueg et al. | ........ 713/300 |

* cited by examiner

*Primary Examiner*—Rehana Perveen
*Assistant Examiner*—Michael J. Brown
(74) *Attorney, Agent, or Firm*—Meyertons Hood Kivlin Kowert & Goetzel, P.C.; Jeffrey C. Hood; Russell E. Henrichs (57) ABSTRACT

A system and method for monitoring usage of peripheral devices and placing a second peripheral device in a low power state when the usage indicates that a second peripheral device is not being used. For example, if a computer system detects that a user's current typing rate indicates the user probably has both hands on a keyboard, the computer system may generate a signal to the computer mouse to enter a low power state. The computer system may use prior usage for a user to determine when current usage indicates that the second peripheral device is not being used. After the second peripheral device is placed in a low power state, the computer system may generate a signal to the second peripheral device to return to a normal power state when the computer system determines that the user no longer has both hands occupied.

14 Claims, 4 Drawing Sheets

POWER MANAGEMENT OF COMPUTER PERIPHERAL DEVICES WHICH DETERMINES NON-USAGE OF A DEVICE THROUGH USAGE DETECTION OF OTHER DEVICES

BACKGROUND OF THE INVENTION

1. Field of the Invention

The present invention relates generally to managing computer peripheral devices and specifically to monitoring computer peripheral device usage for power management.

2. Description of the Related Art

Computers may use many different peripheral devices including, but not limited to, keyboards, computer mouses, monitors, touchscreens, microphones, speakers, cameras, joysticks, and light pens. Many peripheral devices consume power while operating. For example, peripheral devices such as computer mouses and keyboards may send signals to a computer system through radio frequency (RF) signals. In addition, peripheral devices such as touchscreens (e.g., capacitance touchscreens and resistance touchscreens), may continuously use power to detect touch on the touchscreen surface.

To manage peripheral device power usage, the peripheral device may be put into a lower power state by a user to conserve power. However, to effectively conserve power, the user may need to remember power down the peripheral device each time the user is not using the peripheral device, and power up the peripheral device when the user resumes using the peripheral device. Manually turning the peripheral device on and off may be tedious and time consuming. A computer system may be programmed to automatically turn the peripheral device on and off by using a timer. The computer system may turn the peripheral device off if the computer system has not detected any signals from the peripheral device in a predetermined amount of time. However, power may be wasted while the peripheral device remains powered up but unused during the predetermined amount of time. Therefore, improved power management methods are desired.

SUMMARY OF THE INVENTION

A computer system, with a first peripheral device and a second peripheral device, may be programmed to monitor usage of the first peripheral device to determine when the second peripheral device is not being used. In another embodiment, a peripheral control device coupled to the computer system may monitor usage of the first peripheral device to determine when the second peripheral device is not being used. If the usage of the first peripheral device indicates that the second peripheral device is not currently being used, the computer system may generate a signal to place the second peripheral device in a low power state. For example, usage of the first peripheral device may indicate that both of a user's hands are occupied with one or more peripheral devices besides the second peripheral device, or usage may indicate that the hand the user uses with the second peripheral device is occupied.

In one embodiment, the first peripheral device may be a keyboard. If the user is typing on the keyboard at a typing rate faster than a threshold value, the computer system may generate a signal to put the second peripheral device in the low power state. The threshold value may be a preset value, or the computer system may monitor a user's past typing history to determine an appropriate threshold value that will indicate the user has both hands on the keyboard and/or is not using the second peripheral device. In one embodiment, the low power state may include, but is not limited to, any power usage state that consumes less power than a normal power state. Placing the second peripheral device in the low power state may include placing other components of the computer system in the low power state (e.g., a radio frequency transmitter/receiver used by the computer system to communicate with a computer mouse may be put into the low power state if the computer mouse is put into the low power state).

As another example, if the user is typing distant keys on the keyboard with a time delay less than a threshold value, the computer system may send a signal to the second peripheral device to enter the low power state. The threshold value for the time delay may be preset or may be determined by monitoring a user's prior usage. The computer system may store information on prior usage of the first peripheral device and compare current typing information with the user's prior usage.

As another example, if the first peripheral device and a third peripheral device are used within a threshold value, the computer system may send a signal to put the second peripheral device in the low power state. In one embodiment, the first peripheral device may be a keyboard and the third peripheral device may be a touchscreen. The threshold value may be preset or may be determined according to the user's prior usage. For example, if the user uses the first peripheral device, such as the keyboard, and uses the third peripheral device, such as a touchscreen, with a delay less than a threshold value, such as, but not limited to, half a second, the computer system may determine that the user has both hands occupied. The computer system may then generate the signal to the second peripheral device, e.g., a computer mouse, to enter the low power state.

If the usage indicates that the second peripheral device is or may be used and the second peripheral device is in the low power state, the computer system may generate a signal to place the second peripheral device in the normal power state. For example, after the computer system generates a signal to the second peripheral device, such as a computer mouse, to enter the low power state, the computer system may detect that the user's usage of the first peripheral device indicates that the second peripheral device may be used (e.g., the user may slow his/her typing rate or stop typing). The computer may then generate a signal to the second peripheral device to return to the normal power state. Because the computer may generate the signal to the second peripheral device to enter the normal power state before the second peripheral device is actually used by the user, the user may not need to wait for the second peripheral device to return to the normal power state when the user tries to use the second peripheral device.

BRIEF DESCRIPTION OF THE DRAWINGS

A better understanding of the present invention may be obtained when the following detailed description is considered in conjunction with the following drawings, in which.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Figure 1:
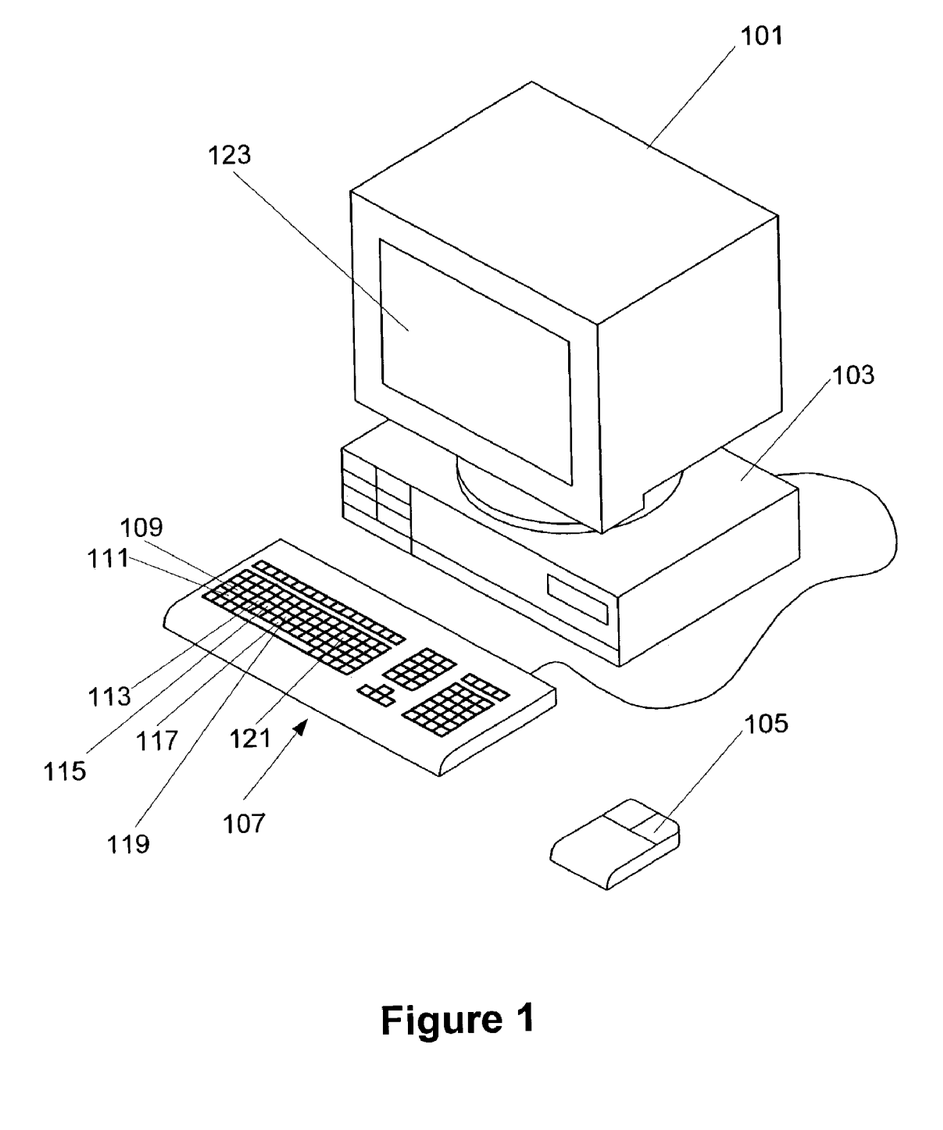
FIG. 1 illustrates a computer system with an RF computer mouse, according to one embodiment.

FIG. 1: A Computer System Using Power Management

FIG. 1 illustrates an embodiment in the form of a computer system with a first peripheral device 107 and a second peripheral device 105. The computer system may include, but is not limited to, a personal computer, a laptop, a tablet style personal computer, and a set top box for a television. As used herein, the "computer system" may also refer to a peripheral control device comprising an RF transmitter/receiver and a microcontroller that may or may not be coupled to a computer. The computer system may include several components including, but not limited to, a processor/memory housing 103, a monitor 101, a first peripheral device 107, and a second peripheral device 105. In one embodiment, the first peripheral device 107 may be a keyboard and the second peripheral device 105 may be a battery powered RF computer mouse. Other peripheral devices including, but not limited to, a microphone, a monitor, a speaker, a camera, a light pen, a joystick, a gamepad, and a keyboard are also contemplated.

In one embodiment, a memory coupled to a processor inside the processor/memory housing 103 may store program instructions executable to monitor usage of the first peripheral device 107. In another embodiment, a peripheral control device coupled to the computer system may monitor usage of the first peripheral device to determine when the second peripheral device is not being used. If the usage of the first peripheral device 107 indicates that the second peripheral device 105 is not currently being used, then the computer system may generate a signal (e.g., an RF signal or an electrical signal comprising a software message) to place the second peripheral device 105 in a low power state. For example, the usage being monitored may indicate that the second peripheral device 105 is not currently being used by detecting a hands-busy event. Note that as used herein, the term "hands-busy event" may refer to any usage that indicates either: 1) both hands are occupied with one or more peripheral devices that are not the second peripheral device 105, or 2) that the hand the user normally uses with the second peripheral device 105 is occupied. For example, if the first peripheral device 107 is a keyboard 107, a hands-busy event may be a user typing on the keyboard 107 at a typing rate that is faster than a threshold value. In one embodiment, the threshold value may be a preset value or the program instructions may be executable to monitor a user's past typing history to determine an appropriate threshold value that will indicate the user has both hands on the keyboard 107.

In one embodiment, the user may provide information to the computer system to modify how the computer system analyzes a user's past usage and/or how the computer system manages the peripheral devices. For example, the user may input which hand the user uses with the second peripheral device, such as specifying a right hand for using a computer mouse. In one embodiment, the computer system may then use information collected about the user and the user's prior usage when the user is logged in to determine when the second peripheral device is not being used. In one embodiment, if the user specifies the right hand for using the computer mouse, when the computer system detects usage of right hand keys (including a number keypad on the keyboard), the computer system may determine that the usage indicates the second peripheral device (i.e., the computer mouse) is not being used and put the second peripheral device in a low power state. In one embodiment, different user information and prior usage may be used when a different user is logged in.

In one embodiment, if the user is typing distant keys on the keyboard 107 with a time delay less than a threshold value, the computer system may send a signal to the second peripheral device 105 to enter the low power state. As used herein, the term "distant keys" refers to keys separated by a distance indicative of both hands being used, e.g., left-hand keys and right-hand keys. The threshold value for the time delay may be determined according to a preset calculated typing rate or may be determined by monitoring the user's prior usage. For example, if the user's prior usage indicates that when the user has pressed a right-hand key 121, e.g., a "P" key 121, and a left-hand key 111, e.g., a "Z" key 111, less than a half a second apart the computer mouse was not being used, a hands-busy event may be defined as a user pressing a right-hand key 121 and a left-hand key 111 in less than half a second.

In one embodiment, the computer system may store information on the user's prior usage of the first peripheral device 107 and compare a current typing pattern with the user's prior usage to determine if a hands-busy event has occurred. For example, to several factors of a user's typing pattern may be considered in the user's prior usage including, but not limited to, the distance between keys, which keys were pressed, and/or which specific keys were pressed within a relative time threshold value for those specific keys. In other words, the user's typing pattern may be monitored to determine time threshold values for relative distances between keys and/or specific combinations of keys.

In one embodiment, software may examine typing characteristics of certain key combinations, such as combination of certain left-hand and right-hand keys. For example, while the user may press an "A" key 109 and a "D" key 113, a first distance apart, within a half a second, prior usage may indicate that the user is capable of pressing the "A" key 109 and the "D" key 113 with one hand while moving the computer mouse with the other hand. However, if the user presses an "F" key 115 and an "N" key 117 (which are also approximately a first distance apart on a standard keyboard 107) in less than half a second, the user's prior usage may indicate that the user most likely has both hands on the keyboard 107.

As another example, a threshold value of less than half a second apart between pressing the "P" key 121 and the "Z" key 111 may be sufficient for one hands-busy event, but a smaller threshold value may be needed for closer keys such as, but not limited to, the "F" key 115 and a "J" key 119. The user's prior usage may indicate that if a user presses the "F" key 115 and the "J" key 119 less than 0.3 seconds apart, the user probably has both hands on the keyboard 107 (i.e. a hands-busy event), but that a time of 0.5 seconds between pressing the "F" key 115 and the "J" key 119 may indicate that the user has only one hand on the keyboard 107 (e.g. if the user types with both hands on the keyboard 107, the user may press the "F" key 115 and the "J" key 119 in less than 0.3 seconds, but the user may also be capable of pressing the "F" key 115 and the "J" key 119 with one hand; although, since using the same hand for these two keys is not the normal typing position, it may take the user a fraction of a second longer to coordinate the fingers on one hand to press these two keys while the user's other hand is free). Other typing patterns and threshold values are also contemplated.

Other hands-busy events are also contemplated. For example, if the first peripheral device 107 and a third peripheral device, both hand-operated devices, are used in a time delay less than a threshold value, the computer system may send a signal to put the second peripheral device 105 in the low power state. In one embodiment, the first peripheral device 107 may include the keyboard 107 and the third peripheral device may include a touchscreen 123. The threshold value may be preset or may be determined according to a user's prior usage. For example, if the user uses the first peripheral device 107, such as the keyboard 107, and uses the third peripheral device, such as the touchscreen 123, with a time delay less than the threshold value, such as, but not limited to, half a second, the computer system may determine that a hands-busy event has occurred and then the computer system may send a signal to the computer mouse to enter the low power state.

In one embodiment, the low power state may include any power usage state of the second peripheral device that consumes less power than a normal power state. Also, in one embodiment, the normal power state may be a more ready state, such as, but not limited to, a power state sufficient to operate the peripheral device. Other power states are also contemplated. Generating a signal to put the second peripheral device in the low power state may include generating a signal to put other components of the computer system, or coupled to the computer system, in a low power state (e.g., a radio frequency transmitter/receiver used by the computer system to communicate with a radio frequency computer mouse may be put into the low power state when the computer mouse is put into the low power state).

In one embodiment, when the monitored usage indicates that the second peripheral device 105 is possibly being used (e.g., a hands busy event is no longer detected), and the second peripheral device 105 is in the low power state, then the computer system may generate a signal to place the second peripheral device 105 in the normal power state. For example, the computer system may detect that the user is using the first peripheral device 107, such as the keyboard, with both hands and then the computer system may generate a signal to the second peripheral device 105, such as a computer mouse, to enter the low power state. Later, the computer system may detect that the user's first peripheral device usage indicates that the second peripheral device 105 may be used (e.g. the user may slow his/her typing rate, stop typing, or use the second peripheral device 105). The computer may then generate a signal to the second peripheral device 105 to enter the normal power state. Because the computer system may anticipate a user's usage of the second peripheral device 105, the computer system may generate a signal to the second peripheral device 105 to enter the normal power state before the second peripheral device 105 is actually used by the user. In other words, the user may not need to wait for the second peripheral device 105 to return to the normal power state when the user tries to use the second peripheral device 105. In one embodiment, the computer system may generate a signal to the second peripheral device 105 to enter the normal power state when the user actually uses the second peripheral device 105. For example, if the second peripheral device 105 is a computer mouse, detected movement of the computer mouse may cause the computer system to generate a signal to the second peripheral device 105 to enter the normal power state.

Figure 2:
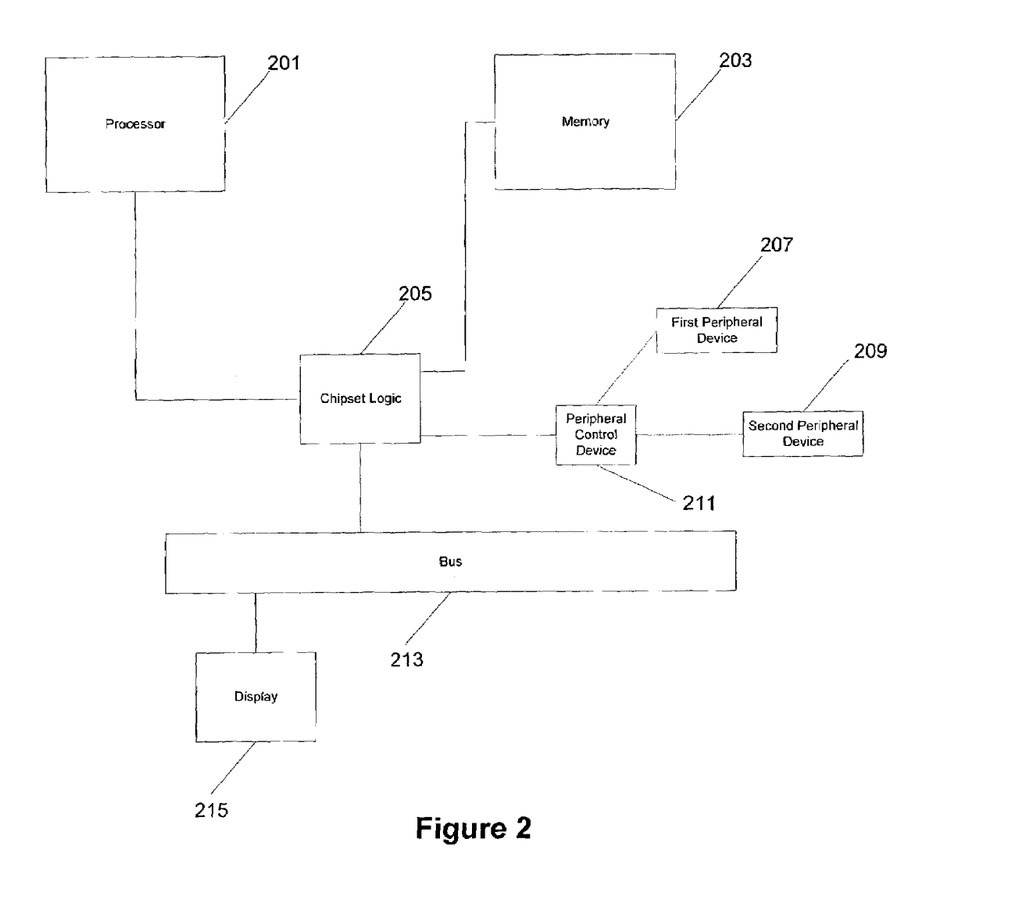
FIG. 2 is a block diagram of a computer system, according to one embodiment.

FIG. 2: A Block Diagram of a Computer System Managing Peripheral Device Power FIG. 2 is a block diagram of an embodiment of a computer system. The computer system may include a memory 203 coupled to a processor 201, such as, but not limited to, a central processing unit (CPU). The memory 203 may store program instructions executable to monitor usage of a first peripheral device 207 (or monitor usage of a plurality of peripheral devices). The program instructions may be further executable to generate a signal to place the second peripheral device 209 in a low power state if the usage of the first peripheral device indicates that the second peripheral device 209 is not currently being used. In one embodiment, a chipset logic 205 may be used to couple the first peripheral device 207 and the second peripheral device 209 to the processor 201 and memory 203. In another embodiment, the chipset logic 205 may not be included. In one embodiment, the computer system may also include a bus 213 and a display 215. In addition, in one embodiment, wireless communication circuitry, referred to in FIG. 2 as peripheral control device 211, such as, but not limited to an RF transmitter/receiver and power management circuitry, may be used to communicate with one or more peripheral devices in a wireless fashion such as, but not limited to, the first peripheral device 207 and the second peripheral device 209. Other components to communicate with the one or more peripheral devices are also contemplated. In one embodiment, the peripheral control device 211 coupled to the computer system may have a microcontroller to monitor usage of the first peripheral device 207 to determine when the second peripheral device 209 is not being used. The first peripheral device 207 may be coupled to the chipset logic 205 or the peripheral control device 211.

If the second peripheral device 209 is in the low power state and the usage of the first peripheral device (or lack of usage) being monitored indicates that the second peripheral device 209 could possibly (or imminently) be used, a signal may be generated to place the second peripheral device 209 in a normal power state. The signal to put the second peripheral device 209 in the normal power state may be generated before the user actually uses the second peripheral device 209, such that the user may not need to wait for the second peripheral device 209 to return to the normal power state when the user tries to use the second peripheral device 209. In one embodiment, multiple peripheral devices may be switched between low power states and normal power states according to the detected usage of other peripheral devices coupled to the computer system.

Figure 3:
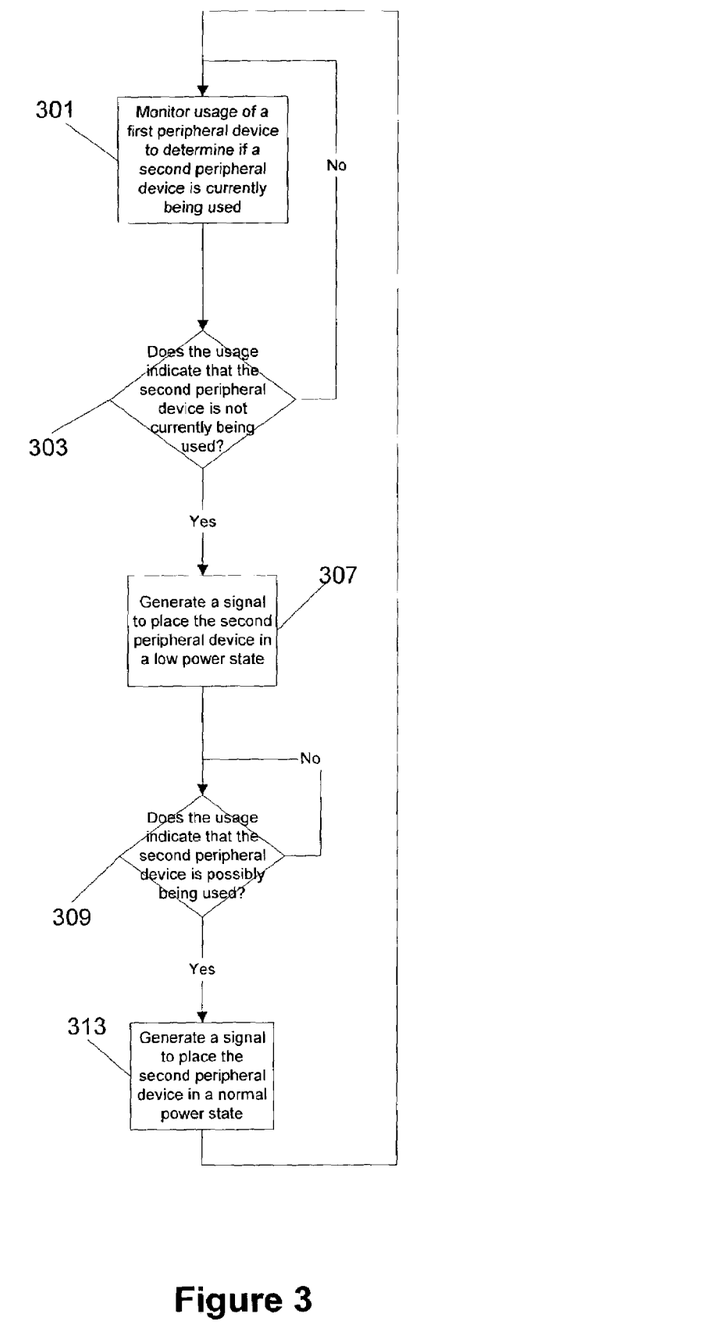
FIG. 3 is a flowchart of a method for detecting whether a first peripheral device is being used to correspondingly placing the second peripheral device in a low power state or a normal power state, according to one embodiment.

FIG. 3: Flowchart For Detecting Use and Coordinating Power

FIG. 3 is a flowchart of one embodiment of a method for detecting whether a first peripheral device is being used to correspondingly switch a second peripheral device between a low power state and a normal power state. The first and second peripheral devices are preferably input devices. The first and second peripheral devices may include, but are not limited to, a computer mouse, a keyboard, a microphone, a touchscreen monitor, a speaker, a camera, a light pen, a gamepad, and a joystick. It should be noted that in various embodiments of the methods described below, one or more of the steps described may be performed concurrently, in a different order than shown, or may be omitted entirely. Other additional steps may also be performed as desired. As described below, the method may be carried out by a computer system and/or a peripheral control device coupled to the computer system.

At 301, a computer system may monitor usage of a first peripheral device (or multiple peripheral devices) to determine if the second peripheral device is currently being used. For example, in one embodiment, the first peripheral device may be a keyboard, and the usage to be monitored may include a typing rate and/or a time delay between pressing distant keys (e.g., left hand keys and right hand keys) on the keyboard. Other usage of a keyboard may also be monitored. In one embodiment, the computer system may also monitor usage of other peripheral devices coupled to the computer system in order to determine if the second peripheral device is being used.

At 303, the computer system may determine if the usage indicates that the second peripheral device is not currently being used. In one embodiment, the computer system may compare current usage to prior usage to determine if the second peripheral device is being used. For example, one or more of typing rates, pressing of distant keys, the location of distant keys pressed, and the length of time between pressing distant keys may be monitored. This current usage information may be compared to prior usage information recorded when the second peripheral device was not being used. For example, the user typing on the keyboard at a typing rate that is faster than a threshold value may indicate that the second peripheral device is not currently being used. In one embodiment, the threshold value may be a preset value or the program instructions may be executable to monitor a user's past typing history to heuristically determine an appropriate threshold value that will indicate a user has both hands on the keyboard. As another example, in one embodiment, if the first peripheral device is the keyboard, the user typing distant keys on the keyboard with a time delay less than a threshold value may indicate that the user has both hands on the keyboard. The threshold value for the time delay may be preset or may be determined by program instructions stored on a computer system memory and executable to monitor a user's prior usage. In another example, both of the user's hands may be occupied if the user is using the first peripheral device and the third peripheral device in a time delay within a threshold value. In one embodiment, the first peripheral device may include the keyboard and the third peripheral device may include a touchscreen. The threshold value may be preset or may be determined according to the user's prior usage.

In one embodiment, the computer system may differentiate between usage that indicates a second peripheral device is not being used in the short term and usage that indicates that the second peripheral device is not being used for a longer period of time. In other words, the computer system may not generate a signal to the second peripheral device every time the computer system determines that both hands are being used, but instead, the computer system may take into account how quickly the user has started using the second peripheral device in the past after certain prior usage.

If the computer system determines that the usage of the first peripheral device (or lack of usage) indicates that the second peripheral device is currently being used, the computer system may not generate a signal to the second peripheral device to enter the low power state. In this embodiment, the computer may return to 301 and the above operations may repeat.

At 307, if the computer system determines in 303 that the usage of the first peripheral device indicates that the second peripheral device is not currently being used, the computer system may generate a signal to place the second peripheral device in the low power state.

After the second peripheral device has been placed in a low power state, at 309, the computer system may determine if the usage of the first peripheral device (or lack thereof) indicates that the second peripheral device is a candidate for use. In other words, the computer system may determine if the usage indicates that the user no longer has both hands occupied. This may involve determining a lack of usage of the first peripheral device and also determining that other peripheral devices are not being used. Other usage that indicates the second peripheral device is a candidate for use or is possibly being used is also contemplated.

If the computer system determines that the usage of the first peripheral device does not indicate that the second peripheral device is possibly being used, the computer system may not generate a signal to the second peripheral device to enter the normal power state. The computer system may then continue to monitor usage in 309, as shown.

At 313, if the computer system determines that the usage of the first peripheral device, indicates that the second peripheral device is possibly being used (e.g., is a candidate for use), and the second peripheral device is in the low power state, the computer system may generate a signal to the second peripheral device to enter the normal power state. The signal to put the second peripheral device in the normal power state may be generated before the user actually uses the second peripheral device such that the user may not need to wait for the second peripheral device to return to the normal power state before the user can use the second peripheral device.

Figure 4:
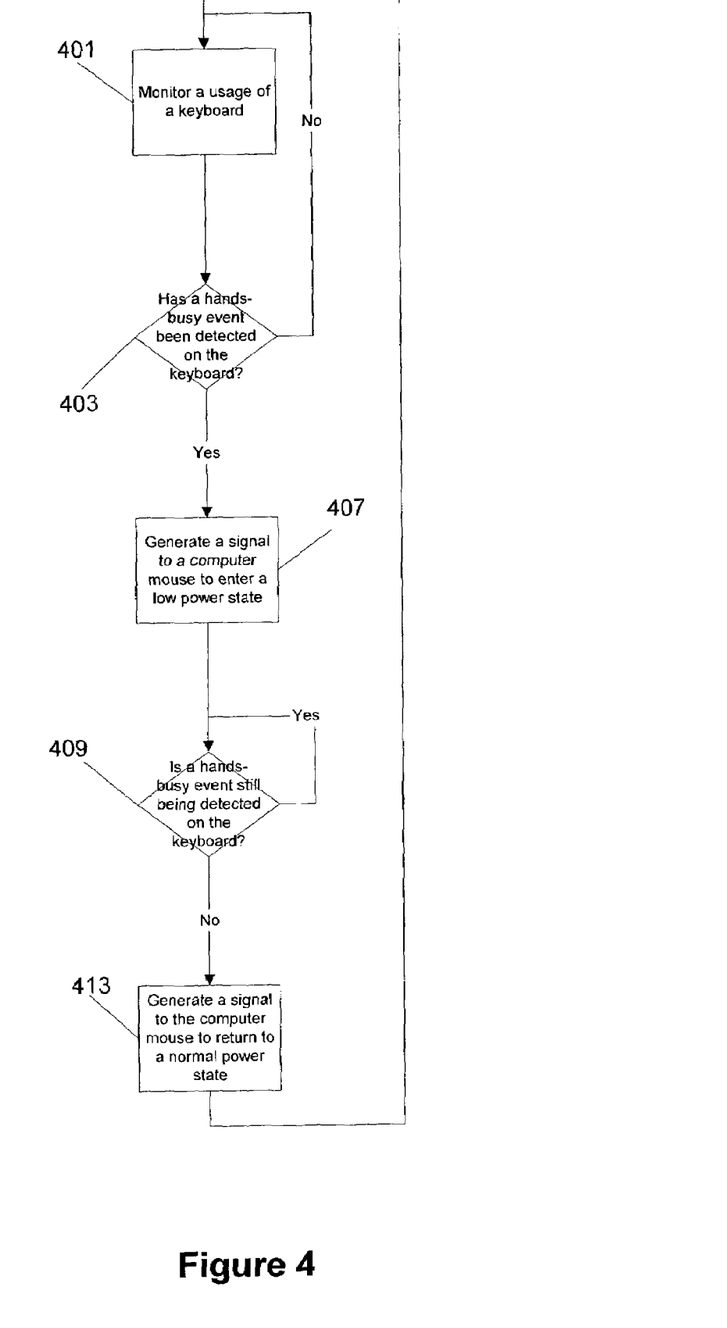
FIG. 4 is a flowchart of a method for detecting a hands-busy event on a keyboard to correspondingly place a computer mouse in a low power state or a normal power state, according to one embodiment.

FIG. 4: One Embodiment For a Keyboard and a Computer Mouse

FIG. 4 is a flowchart of one embodiment of a method for detecting a hands-busy event on a keyboard and correspondingly switching a computer mouse between a low power state and a normal power state. It should be noted that in various embodiments of the methods described below, one or more of the steps described may be performed concurrently, in a different order than shown, or may be omitted entirely. Other additional steps may also be performed as desired.

At 401, a computer system may monitor a usage of a first peripheral device such as a keyboard. In one embodiment, the computer system may monitor typing rates, the distance between keys pressed, the location of keys pressed, and the length of time between pressing keys. Other usage to be monitored is also contemplated. Usage indicating that a second peripheral device, such as a computer mouse, is not being used may be designated as a hands-busy event.

At 403, the computer system may determine if a hands-busy event has been detected on the keyboard. For example, a hands-busy event may be the user typing on the keyboard at a typing rate that is greater than a threshold value, or the user typing distant keys on the keyboard with a time delay less than a threshold value. If a hands-busy event has not been detected on the keyboard, the computer system may not generate a signal to the computer mouse to enter the low power state. In this embodiment, the computer may return to 401 and the above operations may repeat. At 407, if a hands-busy event has been detected on the keyboard, the computer system may generate a signal to the computer mouse to enter the low power state.

At 409, the computer system may determine if the hands-busy event is still being detected on the keyboard. In other words, the computer system may continue monitoring usage of the peripheral devices after the computer mouse has been placed into the low power state. If the computer system is still detecting a hands-busy event on the keyboard, the computer system may not generate a signal to the computer mouse to enter a normal power state. The computer system may continue to monitor usage in 409, as shown. At 413, if the computer system is not still detecting the hands-busy event on the keyboard, the computer system may generate a signal to the computer mouse to enter the normal power state. The signal to put the second peripheral device in the normal power state may be generated before the user actually uses the second peripheral device such that the user may not need to wait for the second peripheral device to return to the normal power state when the user tries to use the second peripheral device.

Various embodiments may further include receiving or storing instructions and/or information implemented in accordance with the foregoing description upon a carrier medium. Suitable carrier media may include storage media or memory media such as magnetic or optical media, e.g., disk or CD-ROM, random access memory, or other memory, as well as transmission media or signals such as electrical, electromagnetic, or digital signals, conveyed via a communication medium such as a network and/or a wireless link.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A computer system, comprising:
a processor;
a keyboard coupled to the processor;
a second peripheral device coupled to the processor;
a memory coupled to the processor and configured to store program instructions executable by the processor to:
monitor usage of the keyboard; and
wherein, if the usage indicates that the second peripheral device is not currently being used by detecting a keyboard typing rate of the keyboard greater than a threshold value, generate a signal to place the second peripheral device in a low power state.

2. The computer system of claim 1, wherein the program instructions are further executable by the processor to:
wherein, if the usage indicates that the second peripheral device is possibly being used and if the second peripheral device is in the low power state, generate a signal to place the second peripheral device in a normal power state.

3. The computer system of claim 1,
wherein the threshold value is determined based on a past typing history of a user.

4. The computer system of claim 1,
wherein the threshold value comprises a calculated typing rate.

5. The computer system of claim 1,
wherein said determining if the usage indicates that the second peripheral device is not currently being used comprises using user information and a user's prior usage of a user that is currently logged into the computer system.

6. The computer system of claim 1,
wherein the program instructions are executable to determine if the usage indicates that the second peripheral device is not currently being used by:
1) storing information on a user's prior usage of the keyboard; and
2) comparing a current typing pattern with the threshold, wherein the threshold is based on the user's prior usage.

7. A method, comprising:
determining if a keyboard is being used to determine if a second peripheral device is being used, wherein the keyboard being used indicates that the second peripheral device is not being used; and
generating a signal to place the second peripheral device in a low power state if the usage indicates that the second peripheral device is not currently being used;
wherein said determining if the keyboard is being used comprises determining if a typing rate of the keyboard exceeds a threshold value.

8. The method of claim 7, further comprising:
generating a signal to place the second peripheral device in a normal power state, if the usage indicates that the second peripheral device is possibly being used, and if the second peripheral device is in the low power state.

9. The method of claim 7,
wherein the threshold value comprises a calculated typing rate.

10. The method of claim 7,
wherein the threshold value is determined based on a past typing history of a user.

11. The method of claim 7,
wherein, in monitoring usage of the keyboard, determining if the usage indicates that the second peripheral device is currently being used comprises:
1) storing information on a user's prior usage of the keyboard; and
2) comparing a current typing pattern with a typing pattern of the user's prior usage.

12. A method, comprising:
monitoring usage of a keyboard to determine if the keyboard is currently being used by a user, wherein said monitoring usage of the keyboard comprises determining if a keyboard typing rate of the keyboard is higher than a threshold value;
generating a signal to place a second peripheral device in a low power state if the usage indicates that the keyboard is currently being used by the user.

13. A method, comprising:
monitoring usage of a keyboard to determine if the keyboard is currently being used by both hands of a user, wherein said monitoring usage of the keyboard comprises determining if a keyboard typing rate of the keyboard is higher than a threshold value;

generating a signal to place a second peripheral device in a low power state if the usage indicates that the keyboard is currently being used by both hands of the user.

14. A computer system, comprising:
a processor;
a keyboard coupled to the processor;
a second peripheral device coupled to the processor;
a memory coupled to the processor and configured to store program instructions executable by the processor to:
monitor usage of the keyboard; and
wherein, if the usage indicates that the second peripheral device is not currently being used by detecting a time delay between a user pressing distant keys on the keyboard in less than a threshold value, generate a signal to place the second peripheral device in a low power state.

* * * * *